US008534701B2

(12) United States Patent
Sosnowski et al.

(10) Patent No.: US 8,534,701 B2
(45) Date of Patent: Sep. 17, 2013

(54) SIDE BOLSTER WITH AIR BAG

(75) Inventors: Yi-Ru Chen Sosnowski, Ann Arbor, MI (US); Vikas Bhatia, South Lyon, MI (US); Shelley Bridget Szalay, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 215 days.

(21) Appl. No.: 13/021,830

(22) Filed: Feb. 7, 2011

(65) Prior Publication Data
US 2012/0200123 A1    Aug. 9, 2012

(51) Int. Cl.
*B60R 21/207*     (2006.01)
*B60K 11/06*      (2006.01)

(52) U.S. Cl.
USPC ............... 280/730.2; 280/728.2; 180/65.21; 180/68.1; 297/254

(58) Field of Classification Search
USPC ............ 280/728.2, 728.3, 730.2; 180/65.21, 180/68.1; 297/250.1, 254; 296/63, 68.1
See application file for complete search history.

(56) References Cited

U.S. PATENT DOCUMENTS

| 4,834,420 | A | * | 5/1989 | Sankrithi et al. | 280/728.1 |
| 5,390,952 | A | | 2/1995 | Goor | |
| 5,564,735 | A | | 10/1996 | Boy et al. | |
| 5,601,332 | A | | 2/1997 | Schultz et al. | |
| 5,947,630 | A | * | 9/1999 | Dillon | 403/393 |
| 6,007,089 | A | | 12/1999 | Gotz et al. | |
| 6,082,818 | A | * | 7/2000 | Muller | 297/250.1 |
| 6,126,192 | A | * | 10/2000 | Enders | 280/728.2 |
| 6,439,597 | B1 | * | 8/2002 | Harada et al. | 280/728.2 |
| 7,204,510 | B2 | * | 4/2007 | Bossenmaier et al. | 280/730.2 |
| 7,530,595 | B2 | * | 5/2009 | Naruse et al. | 280/730.2 |
| 7,905,307 | B2 | * | 3/2011 | Kubota et al. | 180/68.1 |
| 2006/0061073 | A1 | * | 3/2006 | Naruse et al. | 280/730.2 |
| 2007/0187930 | A1 | | 8/2007 | Chitteti et al. | |
| 2008/0296075 | A1 | * | 12/2008 | Zhu et al. | 180/68.1 |
| 2012/0247848 | A1 | * | 10/2012 | Kosaka et al. | 180/68.1 |

* cited by examiner

*Primary Examiner* — Toan C To
*Assistant Examiner* — George Spisich
(74) *Attorney, Agent, or Firm* — Gifford, Krass, Sprinkle, Anderson & Citkowski, P.C.

(57) ABSTRACT

The present invention provides for a support structure and support structure attachment within a vehicle adjacent a vehicle seat. The support structure including a bolster having an external surface wherein the bolster has a cavity recessed behind the external surface wherein the cavity originates and opens to the external surface, an airbag mounted within the cavity, and an elongated bracket mounted to the bolster operable to secure the bolster and airbag assembly to the vehicle. The elongated bracket of the bolster attaches to a child restraint system existing within the vehicle while simultaneously securing the airbag within the cavity of the bolster. A trim piece having a weakened seam covers the cavity and the external surface of the bolster thereby covering the airbag.

12 Claims, 4 Drawing Sheets

SIDE BOLSTER WITH AIR BAG

FIELD OF THE INVENTION

The present invention relates generally to a support structure within an automotive vehicle. More particularly, this invention relates to vehicle structure and cushioning including the incorporation of an airbag.

BACKGROUND OF THE INVENTION

Rear side bolsters are well known in the art to cushion a passenger within a rear vehicle seat and to add structure to a rear vehicle seat. Previously known side bolsters are elongated and generally hollow structures having multiple points of attachment to a vehicle. Previously known side bolsters attach to the vehicle body or the vehicle wheel well. Previously known side bolsters are covered with a foam, or other trim material, in addition to a fabric or leather material. Furthermore, vehicle airbags and restraint systems are becoming commonplace provided in an automotive vehicle. Consumer demand and safety regulations require certain numbers of airbags and airbag placement within an automotive vehicle. However, limited room for airbag storage is provided within current automotive vehicle structures. Accordingly, it is highly desirable to provide storage space and packaging space within an automotive vehicle in an area close to a passenger to meet the increased consumer demand for increased safety features.

SUMMARY OF THE INVENTION

The present invention provides for a support structure and support structure attachment within a vehicle adjacent a vehicle seat. The support structure including a bolster having an external surface wherein the bolster has a cavity recessed behind the external surface wherein the cavity originates and opens to the external surface, an airbag mounted within the cavity, and an elongated bracket mounted to the bolster operable to secure the bolster and airbag assembly to the vehicle. The bolster and external surface of the bolster are made of a rigid material. In the present embodiment, the elongated bracket of the bolster attaches to a child restraint system existing within the vehicle while simultaneously securing the airbag within the cavity of the bolster. In an alternative embodiment, an attachment member of the bolster attached directly to the vehicle body or wheel well. A trim piece, such as foam and/or fabric, covers the cavity and the external surface of the bolster thereby covering the airbag. The trim piece further includes a weakened portion or seam allowing the airbag to burst through the weakened portion of the trim piece.

DETAILED DESCRIPTION OF THE PREFERRED EMBODIMENTS

Figure 1:
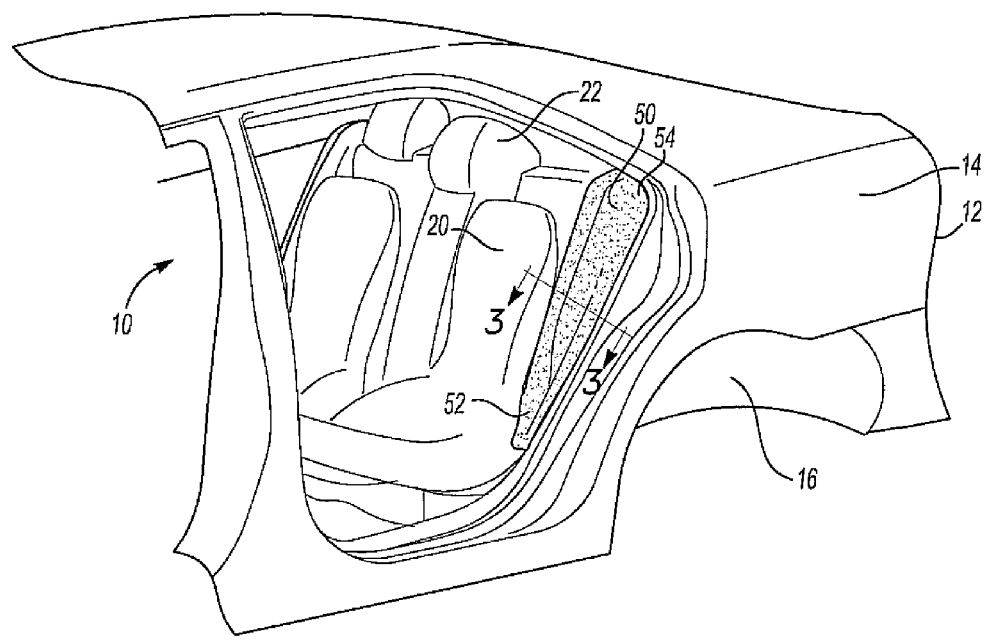
FIG. 1 is a perspective view of the environment of the side bolster assembly.
Figure 3:
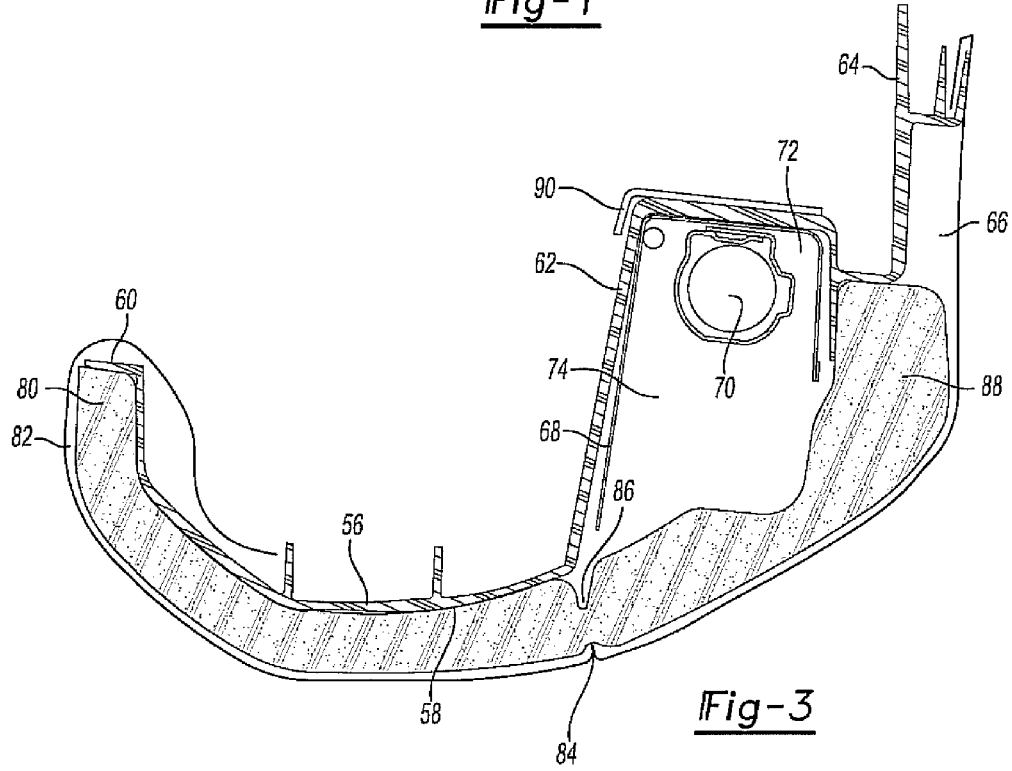
FIG. 3 is a cross-sectional view as shown by the line 3-3 of FIG. 1 of the bolster assembly.
Figure 2:
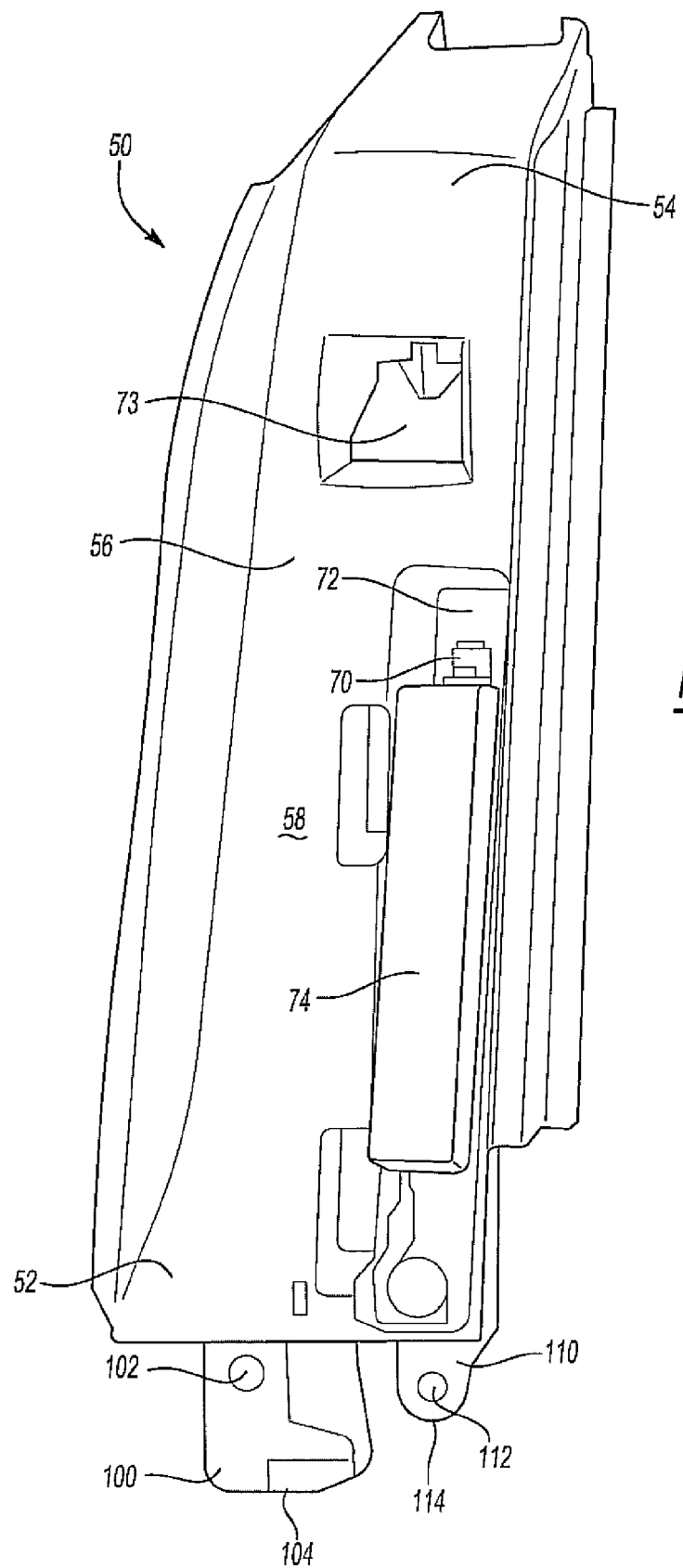
FIG. 2 is a perspective view of the side bolster assembly including the mounted airbag.
Figure 4:
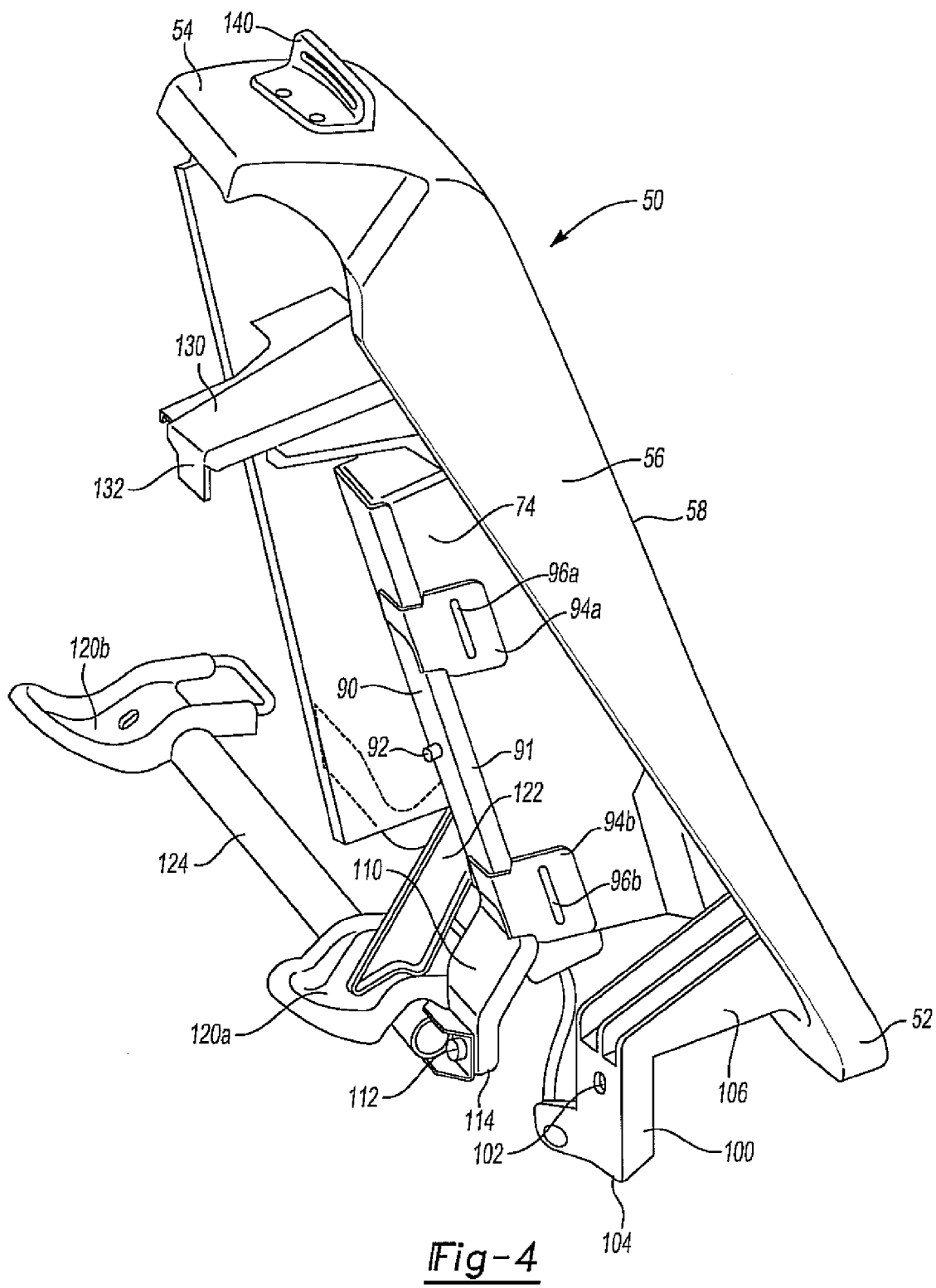
FIG. 4 is a perspective view of the bolster assembly attached to the child restraint system.

The present invention provides for a support structure and support structure attachment within a vehicle having the support structure mounted adjacent a vehicle seat. In the present embodiment, the support structure having a bolster attaches to a child restraint system. More particularly, the airbag disposed within the side bolster attaches to a bracket wherein the bracket attaches to the child restraint system.

The present invention provides for a vehicle 10 having a side bolster 50 disposed therein. The vehicle 10 includes a plurality of seats 20 having headrests 22. The vehicle 10 includes an external surface 14, a rear 12, and a wheel well 16. The side bolster 50 disposed within the vehicle 10 includes a first end 52 and a second end 54. In the present embodiment, the first end 52 is the lower end and the second end 54 is the upper end.

The side bolster 50 is essentially an elongated structure having the first end 52 and the second end 54. The bolster 50 is mounted adjacent a vehicle seat 20. The bolster 50 includes a center body portion 56 including an external surface 58. The external surface 58 is contoured. In an alternative embodiment, the external surface is generally planar with some stylized contouring. The external surface 58 further includes a cavity 72 recessed behind the external surface 58.

The cavity 72 originates from the external surface 58 and is accessible from the external surface 58. The cavity 72 further includes an airbag mounted therein. The airbag 70 mounted within the cavity 72 includes an airbag storage compartment 74. The external surface 58 further includes a second cavity 73 disposed near the second end 54 of the bolster 50.

A layer of foam or other padding material 80 is provided disposed over the external surface 58 of the bolster 50. Furthermore, a layer of fabric or leather 82 is disposed over the foam 80 over the external surface 58. The foam 80 and fabric 82 further include a weakened portion or seam 84. The weakened seam 84 includes an indentation 86 allowing the airbag 70 within the airbag cavity 74 of the airbag storage 68 to rapidly expand and break the weakened seam 84 thereby directing the airbag into the vehicle passenger compartment of the vehicle 10. Alternatively, the weakened portion or seam 84 is loose stitching or glue operable to easily break when subjected to the high forces created by the airbag 70.

In the present embodiment, the fabric 82 extending over the foam 80 extending over the external surface 58 wraps around the bolster 50 to connect to a plurality of brackets 94a, 94b. The brackets 94a, 94b each include an aperture 96a, 96b. The apertures 96a, 96b are elongated to accommodate the fabric 82. Alternatively, the fabric 82 extending over the bolster 50 attaches to attachment point 92 disposed on an elongated bracket 90.

The airbag 70 is mounted within the cavity 72 of the bolster 50. The airbag 70 attaches to the bolster 50 by means of the bracket 90. The bracket 90 is an elongated bracket extending behind the airbag 70. The bracket 90 includes an overhang portion 91 to further secure the bracket 90 to the bolster 50 thereby securing the airbag 70 tightly to the bolster 50. The bracket 90 is elongated and mounted to the bolster 50 covering the full length of the airbag 70. The bracket 90 attaching the airbag 70 to the bolster 50 further attaches to the vehicle to secure the airbag 70.

In the present embodiment, the bracket 90 attaching the airbag 70 to the vehicle 10 attaches to child restraint system 124. The child restraint system 124 includes a first bracket 120a and a second bracket 120b disposed on either side of the vehicle 10. The bracket 90 includes a lower member 110 having a lower portion 114. The lower member 110 of the bracket 90 includes an aperture or connection means 112 allowing the bracket 90 to securely attach to the child restraint system 124. Since the child restraint system 124 is required by various safety standards to meet various safety requirements, the child restraint system 124 is fully capable and strong enough to hold and contain the deployment of the airbag 70 when mounted to the bolster 50. Furthermore, attachment of the bolster 50 to the child restraint system 124 prevents wobbling of the bolster 50.

Alternatively, the bolster 50 includes an attachment means and bracket 106 disposed at the first end 52 of the bolster 50. The bracket 106 includes a lower portion 110 having an attachment means 102. The attachment means 102 and lower member 100 connect to a portion of the vehicle body, such as the wheel well. The attachment of the lower member 100 of the bracket 106 of the bolster 50 facilitates attachment of the bolster 50 to securely mount the bolster 50 adjacent a vehicle seat 20, or other vehicle 10 structure.

An attachment bracket 130 is provided towards the second end 54 of the bolster 50 to facilitate attachment of the bolster 50 to the vehicle. The attachment bracket 130 includes a hook 132 to connect the bolster 50 in the attachment bracket 130 to the vehicle. Furthermore, attachment means or seatbelt facilitator 140 is disposed at the upper end or second end 54 of the bolster 50. The attachment means 140 is used to direct a seatbelt used by a vehicle passenger. Alternatively, the attachment means 140 further secures the fabric 82 over the external surface 58.

Figure 5:
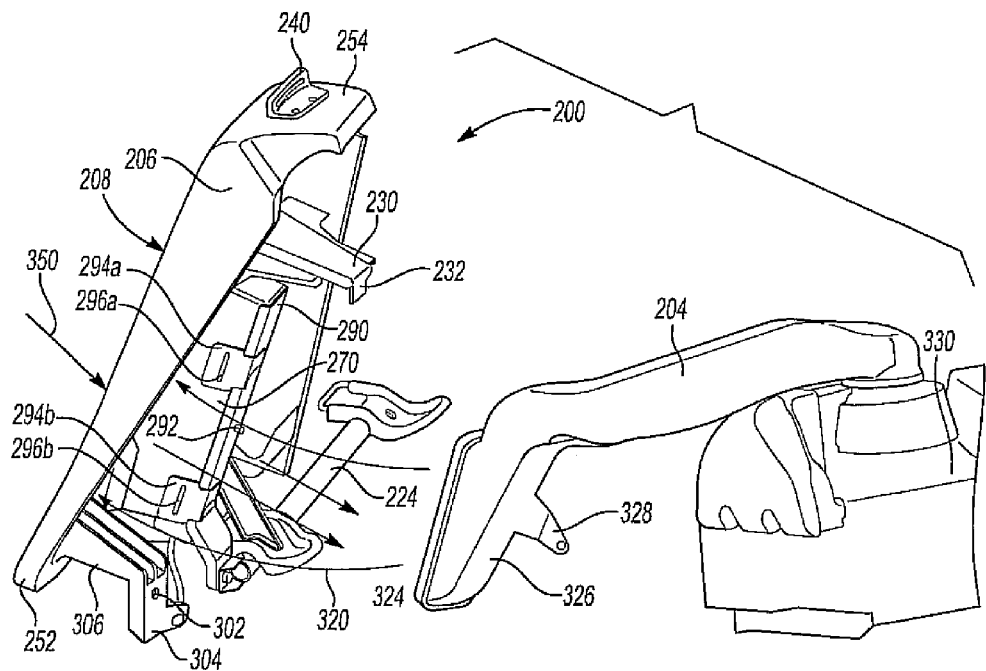
FIG. 5 is a perspective view of an alternative embodiment of the bolster having an air intake.
Figure 6:
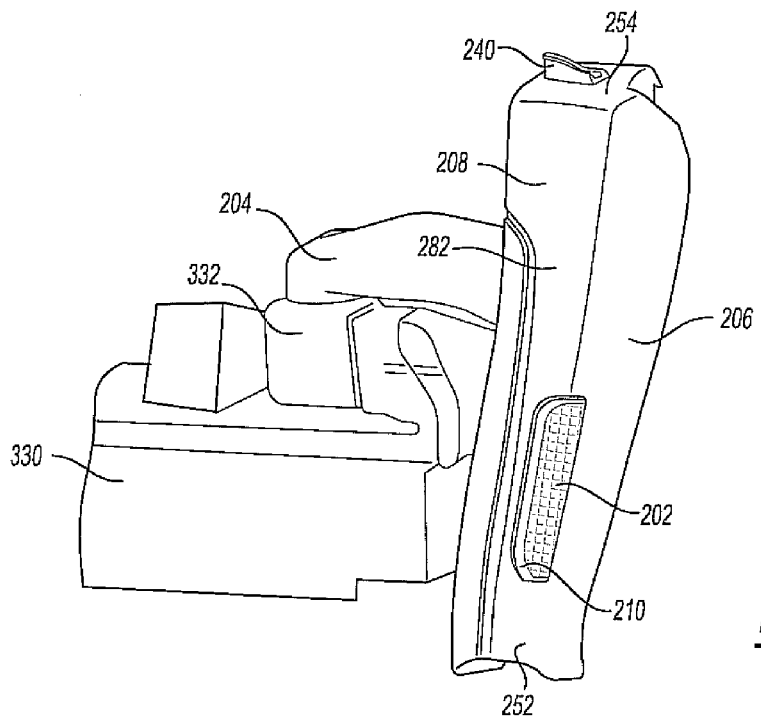
FIG. 6 is a perspective frontal view of an alternative embodiment of the bolster having an air intake.

In an alternative embodiment, as shown in FIGS. 5 and 6, a bolster assembly 200 is provided including an air intake 202 connected to a duct 204. The intake 202 is positioned on the bolster 206. The intake 202 is mounted on a first surface 208 of the bolster 206. The bolster 206, including the first surface 208, is generally rounded including a plurality of contours to compliment the styling of the interior of the vehicle.

Arrows 350 illustrate the flow of air from the inside of the vehicle cabin to a hybrid engine 330. Air from the cabin is pulled through the intake 202 and through the duct 204. Air then passes through the connector 332 and cools the hybrid engine 330. The duct 204 further includes an attachment means 328 to attach the duct 204 to the vehicle for securing purposes. The duct 204 includes a first open end 324 having a curved intake 326. The first open end 324 of the duct 204 connect to the intake 202 as shown by arrows 320.

The bolster 206 includes an attachment means and bracket 306 disposed at the first end 252 of the bolster 206. The bracket 306 includes a lower portion 304 having an attachment means 302. The attachment means 302 connect to a portion of the vehicle body, such as the wheel well. The attachment of the lower member 304 of the bracket 306 of the bolster 206 facilitates attachment of the bolster 206 to securely mount the bolster 206 adjacent a vehicle seat.

In this alternative embodiment, a fabric 282 extending over a foam extending over the first surface 208 wraps around the bolster 206 to connect to a plurality of brackets 294a, 294b. The brackets 294a, 294b each include an aperture 296a, 296b. The apertures 296a, 296b are elongated to accommodate the fabric 282. Alternatively, the fabric 282 extending over the bolster 206 attaches to attachment point 292 disposed on an elongated bracket 290.

The bracket 290 is an elongated bracket extending behind the airbag 270. The bracket 290 is elongated and mounted to the bolster 206 covering the full length of the airbag 270. The bracket 290 attaching the airbag 270 to the bolster 206 further attaches to the vehicle to secure the airbag 270.

In this alternative embodiment, the bracket 206 attaching the airbag 270 to the vehicle attaches to a child restraint system 224. An attachment bracket 230 is provided towards the second end 254 of the bolster 206 to facilitate attachment of the bolster 206 to the vehicle. The attachment bracket 230 includes a hook 232 to connect the bolster 206 in the attachment bracket 230 to the vehicle. Furthermore, attachment means or seatbelt facilitator 240 is disposed at the upper end or second end 254 of the bolster 206. The attachment means 240 is used to direct a seatbelt used by a vehicle passenger. Alternatively, the attachment means 240 further secures the fabric 282 over the external surface 208.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

The invention claimed is:

1. A support structure and support structure attachment assembly within a vehicle, the vehicle having an integrated child restraint system, the assembly positioned adjacent a vehicle seat, the support structure comprising:
    a bolster having an outer external surface, the bolster having a cavity recessed from the outer external surface and protruding behind the external surface;
    an airbag mounted within the cavity; and
    an attachment member directly mounted to the airbag, the attachment member immovably fixed and directly connected to the integrated child restraint system operable to secure the bolster and airbag assembly to the vehicle.

2. The assembly of claim 1, wherein the bolster is rigid.

3. The assembly of claim 1, wherein the attachment member mounted to the bolster attaches to a wheel wall of the vehicle.

4. The assembly of claim 1, wherein the cavity recessed behind the external surface of the bolster is generally rectangular.

5. The assembly of claim 1, wherein a trim piece covers the cavity behind the external surface thereby covering the airbag.

6. The assembly of claim 5, wherein the trim piece includes a weakened portion allowing for the airbag to burst through the weakened portion of the trim piece.

7. The assembly of claim 6, wherein the weakened portion is a localized indentation in the trim piece.

8. The assembly of claim 1, wherein the attachment member is an elongated bracket.

9. The assembly of claim 8, wherein the elongated bracket secures the airbag assembly to the bolster while simultaneously securing the bolster to the vehicle.

10. The assembly of claim 9, wherein the elongated bracket secures the airbag assembly to the bolster while simultaneously securing the bolster to a child restraint system.

11. The assembly of claim 1, wherein the bolster further includes an air intake.

12. The assembly of claim 11, wherein the air intake is mounted to the external surface.

* * * * *